United States Patent
Bai et al.

(10) Patent No.: US 10,889,675 B2
(45) Date of Patent: Jan. 12, 2021

(54) RHEOLOGY MODIFIERS FOR ENCAPSULATING QUANTUM DOTS

(71) Applicants: Dow Global Technologies LLC, Midland, MI (US); Rohm and Haas Electronic Materials LLC, Marlborough, MA (US)

(72) Inventors: Zhifeng Bai, Midland, MI (US); Jake Joo, Somerville, MA (US); James C. Taylor, Grafton, MA (US); Liang Chen, Midland, MI (US); Valeriy V. Ginzburg, Midland, MI (US); Jessica Ye Huang, Midland, MI (US); Christopher J. Tucker, Midland, MI (US)

(73) Assignees: Rohm and Haas Electronic Materials LLC, Marlborough, MA (US); Dow Global Technologies LLC, Midland, MI (US)

( * ) Notice: Subject to any disclaimer, the term of this patent is extended or adjusted under 35 U.S.C. 154(b) by 15 days.

(21) Appl. No.: 16/078,878

(22) PCT Filed: May 12, 2017

(86) PCT No.: PCT/US2017/032311
§ 371 (c)(1),
(2) Date: Aug. 22, 2018

(87) PCT Pub. No.: WO2017/205079
PCT Pub. Date: Nov. 30, 2017

(65) Prior Publication Data
US 2019/0085112 A1  Mar. 21, 2019

Related U.S. Application Data

(60) Provisional application No. 62/342,280, filed on May 27, 2016.

(51) Int. Cl.
*B82Y 20/00* (2011.01)
*B82Y 40/00* (2011.01)
*C08F 287/00* (2006.01)
*C08F 292/00* (2006.01)
*C09K 11/02* (2006.01)
*C08K 5/10* (2006.01)
*C08K 3/08* (2006.01)
*B82Y 30/00* (2011.01)

(52) U.S. Cl.
CPC ............ *C08F 287/00* (2013.01); *B82Y 20/00* (2013.01); *C08F 292/00* (2013.01); *C08K 3/08* (2013.01); *C08K 5/10* (2013.01); *C09K 11/02* (2013.01); *B82Y 30/00* (2013.01); *B82Y 40/00* (2013.01); *C08K 2201/001* (2013.01)

(58) Field of Classification Search
CPC ...... C08F 287/00; C08F 292/00; B82Y 20/00; B82Y 40/00; C08K 3/08; C08K 5/10; C08K 2201/001; C09K 11/02
See application file for complete search history.

(56) References Cited

U.S. PATENT DOCUMENTS

2016/0272885 A1* 9/2016 Bai .................. B32B 27/302

FOREIGN PATENT DOCUMENTS

JP 2015028139 A 2/2015

\* cited by examiner

*Primary Examiner* — Irina S Zemel
*Assistant Examiner* — Jeffrey S Lenihan
(74) *Attorney, Agent, or Firm* — G. Creston Campbell

(57) ABSTRACT

A polymer resin comprising: (a) quantum dots, (b) a compound of formula (I) (I) wherein $R^1$ is hydrogen or methyl and $R^2$ is a $C_6$-$C_{20}$ aliphatic polycyclic substituent, and (c) a block or graft copolymer having Mn from 50,000 to 400,000 and comprising from 10 to 100 wt % polymerized units of styrene and from 0 to 90 wt % of a non-styrene block; wherein the non-styrene block has a van Krevelen solubility parameter from 15.0 to 17.5 $(J/cm^3)^{1/2}$.

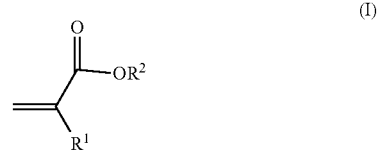

(I)

10 Claims, No Drawings

RHEOLOGY MODIFIERS FOR ENCAPSULATING QUANTUM DOTS

FIELD OF THE INVENTION

The present invention relates to rheology modifiers useful in a process for preparing a multilayer polymer composite containing quantum dots.

BACKGROUND OF THE INVENTION

Semiconductor quantum dots (QD) provide optical absorption and emission (photoluminescence PL or electroluminescence EL) behaviors that are significantly different from those of bulk materials. As the particle size decreases, effective energy bandgap (Eg), or available energy levels, increases and creates a blue shifted PL spectrum. This spectrum tunability by the particle size dependent quantum confinement effect within the same material is a critical advantage over conventional bulk semiconductors. Because of their unique optical properties, QD have been of great interest in many display and lighting applications. Most QD have inorganic shells with a larger bandgap material to confine electron and hole pairs within the core region and prevent any surface charge states. The outer shells are then capped by organic ligands to reduce trap states of the shell that can lead to reduced quantum yield (QY). Organic ligands help QD to disperse in organic/aqueous solvents. Typical organic ligands surrounding QD have relatively long alkyl chains which provide high solubility in non-polar solvents or monomers. Unfortunately, QD are very susceptible to photo-oxidation during light absorption/conversion process. Also, moisture can have similar impacts when ligands are not compatible. QD typically are encapsulated in a polymer matrix to protect them from adverse effects of water and oxygen. For example, US2010/0084629 discloses a variety of polymers as encapsulants. However, this reference does not disclose the polymer compositions described herein.

SUMMARY OF THE INVENTION

The present invention provides a polymer resin comprising:
(a) quantum dots,
(b) a compound of formula (I)

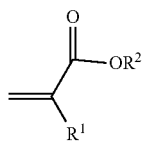

wherein $R^1$ is hydrogen or methyl and $R^2$ is a $C_6$-$C_{20}$ aliphatic polycyclic substituent, and
(c) a block or graft copolymer having $M_n$ from 50,000 to 400,000 and comprising from 10 to 100 wt % polymerized units of styrene and from 0 to 90 wt % of a non-styrene block; wherein the non-styrene block has a van Krevelen solubility parameter from 15.0 to 17.5 $(J/cm^3)^{1/2}$.

The present invention further provides a polymer resin comprising:
(a) quantum dots,
(b) a compound of formula (I), and
(c) a homopolymer or random copolymer with $M_n$ greater than polymer critical molecular weight, $M_c$ and with a van Krevelen solubility parameter from 16.5 to 20.0 $(J/cm^3)^{1/2}$.

DETAILED DESCRIPTION OF THE INVENTION

Percentages are weight percentages (wt %) and temperatures are in ° C., unless specified otherwise. Operations were performed at room temperature (20-25° C.), unless specified otherwise. Boiling points are measured at atmospheric pressure (ca. 101 kPa). "(Meth)acrylate" means acrylate or methacrylate. Quantum dots are well known in the art, see, e.g., US2012/0113672. Number-average molecular weight, $M_n$, is measured by size exclusion chromatography. A hydrocarbon polymer is a polymer having no more than 5 wt % of elements other than hydrogen and carbon, preferably no more than 3 wt %, preferably no more than 1 wt %, percentages based on dry weight of the entire polymer.

The van Krevelen solubility parameter is described by Bicerano (Prediction of Polymer Properties, 3rd edition, Marcel Dekker, New York, 2002, Chapter 5) and tabulated in Table 5.2 ("$\delta_2$") of the same book for a number of commercially relevant polymers. For an arbitrary polymer with known monomer chemical structure, van Krevelen-type solubility parameter can be computed using algorithms outlined in the same reference or using Materials Studio software, Synthia module (http://accelrys.com/products/collaborative-science/biovia-materials-studio/polymers-and-classical-simulation-software.html). For random copolymers, the copolymer solubility parameter can be calculated as weight-average of the solubility parameters of its comonomers.

Critical molecular weight, Mc, is calculated as described by Bicerano (Prediction of Polymer Properties, 3-rd edition, Marcel Dekker, New York, 2002, Chapters 11 and 13). For example, for polystyrene (PS), Mc=30 kg/mol, for poly (methylmethacrylate) (PMMA), Mc=18 kg/mol, etc. For an arbitrary polymer with known monomer chemical structure, critical molecular weight can be computed using algorithms outlined in the same reference or using Materials Studio software, Synthia module (http://accelrys.com/products/collaborative-science/biovia-materials-studio/polymers-and-classical-simulation-software.html).

In one preferred embodiment of the invention, a polymer composite made using the resin of this invention is part of a multilayer assembly which also comprises an outer layer on each side of the polymer composite. Preferably, the outer layer is an oxygen bather which also inhibits passage of moisture. Preferably, the outer layer comprises a polymer film, preferably one comprising polyethylene terephthalate (PET), polyaryletherketones, polyimides, polyolefins, polycarbonate, polymethyl methacrylate (PMMA), polystyrene, or a combination thereof. Preferably, the outer layer further comprises oxides or nitrides, preferably silicon oxides, titanium dioxide, aluminum oxide, silicon nitrides or a combination thereof. Preferably the oxides or nitrides are coated on the surface of the polymer film facing the QD layer. Preferably, each outer layer comprises a polymer film having a thickness from 25 to 150 microns (preferably 50 to 100 microns) and an oxide/nitride layer having a thickness from 10 to 100 nm (preferably 30 to 70 nm). In some preferred embodiments of the invention, the outer layer comprises at least two polymer film layers and/or at least two oxide/nitride layers; different layers may be of differing composition. Preferably, the outer layers have a very low oxygen transmission rate (OTR, <$10^{-1}$ cc/m$^2$/day) and low water vapor transmission rate (WVTR, <$10^{-2}$ g/m²/day). Preferably, the polymer film in the outer layers has a Tg from 60 to 200° C.; preferably at least 90° C., preferably at least 100° C.

Preferably, the thickness of the polymer composite of this invention is from 10 to 500 microns, preferably at least 20 microns, preferably at least 30 microns, preferably at least 40 microns; preferably no greater than 400 microns, preferably no greater than 300 microns, preferably no greater than 200 microns, preferably no greater than 150 microns. Preferably, the thickness of each outer layer is from 20 to 100 microns, preferably from 25 to 75 microns Preferably, the polymer composite of this invention is prepared by free radical polymerization of the resin prepared by mixing monomers, QD and other optional additives. Preferably, the resin is coated on a first outer layer prior to curing by typical methods, e.g., spin coating, slot die coating, gravure, ink jet and spray coating. Preferably, curing is initiated by exposing the resin to ultraviolet light or heat, preferably ultraviolet light, preferably in the UVA range.

Preferably, $R^2$ is a $C_7$-$C_{17}$ aliphatic polycyclic substituent, preferably $R^2$ is a $C_8$-$C_{15}$ aliphatic polycyclic substituent. Preferably, $R^2$ is a bridged polycyclic substituent; preferably a bicyclic, tricyclic or tetracyclic substituent; preferably a bicyclic or tricyclic substituent. Preferably, $R^2$ is a saturated aliphatic substituent. Preferred structures for $R^2$ include, e.g., adamantanes, bicyclo[2,2,1]alkanes, bicyclo[2,2,2]alkanes, bicyclo[2,1,1]alkanes and tricyclodecanes (e.g., tricyclo[5,2,1,0$^{26}$]decane); these structures may be substituted with alkyl, alkoxy groups, hydroxy groups or (meth)acrylate esters (i.e., the compound of formula (I) may have at least two (meth)acrylate ester substituents; preferably no more than two); preferably alkyl and alkoxy groups have from one to six carbon atoms, preferably one to four. Tricyclodecanes and bicyclo[2,2,1]alkanes are especially preferred, particularly tricyclo[5,2,1,0$^{26}$]decane, dimethanol dimethacrylate and isobornyl acrylate. More than one compound of formula (I) may be present in the resin. Preferably, the resin comprises a compound of formula (I) having one (meth)acrylate ester substituent and a compound of formula (I) having two (meth)acrylate ester substituents; preferably in a weight ratio from 100:1 to 1:20, respectively; preferably 10:1 to 1:15.

Preferably, the polymer resin comprises from 70 to 95 wt % of the compound(s) of formula (I); preferably at least 73 wt %, preferably at least 76 wt %, preferably at least 79 wt %; preferably no more than 93 wt %, preferably no more than 91 wt %, preferably no more than 89 wt %.

Preferably, the polymer resin of this invention comprises from 0.01 to 5 wt % of quantum dots, preferably at least 0.03 wt %, preferably at least 0.05 wt %; preferably no more than 4 wt %, preferably no more than 3 wt %, preferably no more than 2 wt %. Preferably, quantum dots comprise CdS, CdSe, CdTe, ZnS, ZnSe, ZnTe, HgS, HgSe, HgTe, GaN, GaP, GaAs, InP, InAs or a combination thereof.

Preferably, ligands surrounding the inorganic part of quantum dots have non-polar components. Preferred ligands include, for example, trioctyl phosphine oxide, dodecanethiol and fatty acid salts (e.g., stearate salts, oleic acid salts).

Preferably, the block or graft copolymer is a hydrocarbon polymer. The block or graft polymer is added to the polymer resin as a rheology modifier, i.e., a thickener. Preferably, the block or graft polymer comprises at least 15 wt % styrene, preferably at least 20 wt %, preferably at least 25 wt %; preferably no more than 90 wt %, preferably no more than 80 wt %, preferably no more than 70 wt %, preferably no more than 60 wt %, preferably no more than 50 wt %, preferably no more than 45 wt %. Preferably, the block or graft polymer comprises at least 10 wt % of a non-styrene block, preferably at least 20 wt %, preferably at least 30 wt %, preferably at least 40 wt %, preferably at least 50 wt %, preferably at least 55 wt %; preferably no more than 85 wt %, preferably no more than 80 wt %, preferably no more than 75 wt %, preferably no more than 60 wt %, preferably no more than 50 wt %, preferably no more than 45 wt %. Preferably, the non-styrene monomers in the copolymer (non-styrene block) are alkenes, dienes, (meth)acrylates, siloxanes, or combinations thereof; preferably alkenes and/or dienes. Preferably, the non-styrene in the copolymer comprises polymerized units of $C_2$-$C_8$ alkenes and/or dienes, preferably $C_2$-$C_5$ alkenes and/or dienes. Preferably, the block or graft polymer is a block copolymer. Preferably, the $C_2$-$C_8$ alkenes and/or dienes are selected from ethylene, propylene, butylene, isoprene and butadiene. Preferably, $M_n$ of the block or graft polymer is at least 60,000, preferably at least 70,000, preferably at least 80,000; preferably no more than 350,000, preferably no more than 300,000, preferably no more than 250,000.

Preferably, the non-styrene block has a van Krevelen solubility parameter less than 17.2 (J/cm³)$^{1/2}$, preferably less than 17, preferably less than 16.5; preferably at least 15.5.

Preferably, a homopolymer or random copolymer with $M_n$ greater than polymer critical molecular weight, $M_c$, has a van Krevelen solubility parameter no greater than 19.5 (J/cm³)$^{1/2}$; preferably at least 17, preferably at least 17.5, preferably at least 18.0. Preferably, $M_n$ is at least 1.5 times $M_c$, preferably at least twice; preferably no more than 20 times $M_c$, preferably no more than ten times. Preferred polymers having $M_n$ greater than $M_c$ include, e.g., those comprising polymerized units of styrene, alkenes, dienes, (meth)acrylates, siloxanes, or combinations thereof. $M_c$ for polystyrene is 30,000 kDa.

Other additives which may be incorporated into the polymer composite of this invention include UV stabilizers, antioxidants and scattering agents to improve light extraction.

Preferred forms for the polymer composite include, e.g., films, beads, strips, rods, cubes and plates. The polymer composite is useful in many applications, including, e.g., displays, lighting and medical applications. Preferred display applications include public information displays, signage, televisions, monitors, mobile phones, tablets, laptops, automotive dashboards and watches.

EXAMPLES

Sample Preparation for Examples

A) Liquid Sample Preparation

All QD resin samples were prepared under inert environment. Styrene-based polymers were dissolved in isobornyl acrylate by mixing at 80° C. for ~30 min using magnetic stirring. After all components except quantum dots were loaded to a crimp vial, the vial is degassed and mixed for 3 to 5 minutes using a dual axis planetary mixer (Thinky ARE-310). Quantum dots were pre-dispersed in isobornyl acrylate, then mixed with the other components followed by rolling for 1 hr.

B) Film Sample Preparation

All samples were prepared by lamination of the resin formulations between two i-Component PET barrier films. Approximately 2 mL of resin was dispensed on the bottom film and the top has applied with a gap coating bar with gap setup based on desired film thickness. Samples were cured in a Fusion UV F300S curing system with UVA ~400 mJ/cm². The films were then cut into approximately 0.2" square pieces for Quantum Yield Measurements and 1×1" square pieces for photo oxidation tests. Freestanding films were also prepared by coating of the resin formulations on glass, followed by curing in a FUSION UV SYSTEMS, INC (DRS-10/12 QNH) with UVA ~400 mJ/cm². The freestanding films were then delaminated from glass and used for $O_2$ permeability testing using Mocon ox-tran model 2/21 with 3% $O_2$ and 97% $N_2$ at 23° C.

C) Characterization

Viscosity was measured by Brookfield DV-II+ viscometer. Frequency sweep and steady state flow experiments of resins were performed using a AR G2 rheometer at 20° C. Both liquid and film photoluminescent Quantum Yield (PLQY), peak emission wavelength (PWL) and full-width half-max of the emission peak (FWHM) were measured with a Hamamatsu C9920-02G integrating sphere. Film thicknesses were determined by measurement of the cured films with a micrometer and then subtracting out the barrier film thickness. Edge ingress was determined by image analysis of 1"×1" samples aged on a bare backlight unit. Number average molecular weight ($M_n$) and polydispersity (PDI) of polymers were determined using a size exclusion chromatography equipped with a mixed A PLgel 20 um×300 mm×7.5 mm (×2+ guard) column with stabilized tetrahydrofuran at 1.0 mL/min @35° C. and a refractive index detector (against polystyrene standards).

D) Chemical Composition Description:

| Polymer rhoelogy modifier | CAS number | Chemistry | Styrene content | η in 25 wt % solution at 25° C. (Pa · s)* | Melt index at 230° C., 5 kg, g/10 min* | Mn (kDa) | PDI | Van Krevelen Solubility Parameter of Non-Styrene Block, $(J/cm^3)^{1/2}$ |
|---|---|---|---|---|---|---|---|---|
| Polystyrene | 9003-53-6 | Styrene homo | 100% | | | 139 | 2.85 | |
| KRATON A1535 | 66070-58-4 | SEBS triblock | 56-60% | | <1 | 244 | 1.41 | 15.9 |
| KRATON G1701 | 68648-89-5 | SEP diblock | 35-39% | >50 | 1 | 149 | 1.18 | 16.4 |
| KRATON G1652 | 66070-58-4 | SEBS triblock | 28-30% | 1.8 | 6 | 85 | 1.19 | 15.9 |
| KRATON G1650M | 66070-58-4 | SEBS triblock | 28.8-31.6 w% | 1100-1900 (20 w%) | <1 | 101 | | 15.9 |
| KRATON G1702 | 68648-89-5 | SEP diblock | 26-29% | 50 | <1 | 208 | 1.21 | 16.4 |
| KRATON G1642 | 66070-58-4 | SEBS triblock | 19-23% | 1.1-1.6 | <1 (2.16 kg) | 138 | 1.16 | 15.9 |
| KRATON G1645 | 66070-58-4 | SEBS triblock | 12-14% | | 2-4.5 (2.16 kg) | 186 | 1.32 | 15.9 |
| KRATON G1750 | 127883-08-3 | (EP)n star | 0% | 8.7 | 8 (200° C.) | 489 | 1.26 | |

*Data from KRATON
SEBS: styrene-ethylene/butylene-styrene;
SEP: styrene-ethylene/propylene;
EP: ethylene/propylene

| Chemical name | Description | CAS # |
|---|---|---|
| AEROSIL R104 | A hydrophobic fumed silica after treated with (Octamethylcyclotetrasiloxane) | 68583-49-3 |
| AEROSIL R106 | A hydrophobic fumed silica after treated with (Octamethylcyclotetrasiloxane) | 68583-49-3 |
| AEROSIL R974 | A hydrophobic fumed silica after treated with Dimethyldichlorosilane | 68611-44-9 |
| AEROSIL R812S | A hydrophobic fumed silica after treated with hexamethyldisilazane | 68909-20-6 |
| CABOSIL TS720 | A medium surface area fumed silica which has been surface modified with polydimethylsiloxane | 67762-90-7 |
| CABOSIL TS530 | A treated, high-purity silica that has been treated with hexamethyldisilazane. | 68909-20-6 |

Example 1

1001 Formulation

Comparison of Fumed Silica to KRATON Block Copolymer (Styrene-Ethylene/Butylene-Styrene Triblock Copolymer (SEBS))

The KRATON block copolymer showed higher viscosity enhancement of the acrylic monomer than the inorganic fume silica Both the KRATON block copolymer and some of the inorganic fumes silica showed compatibility with QD.

| Formulation | Isobornyl acrylate + Additive (6 wt %) | Viscosity (cP at 25° C.) |
|---|---|---|
| A1 | none | 8 |
| B1 | AEROSIL R104 | 37.3 |
| C1 | AEROSIL R106 | 60.6 |
| D1 | AEROSIL R974 | 96 |
| E1 | AEROSIL R812S | 69 |
| F1 | CABOSIL TS720 | 64.8 |
| G1 | CABOSIL TS530 | 31.5 |
| H1 | KRATON G1652 | 145 |

| Formulation | Isobornyl acrylate + Additive (2 wt %) + Nanoco CFQD™ quantum dot (0.175 wt %) | Quantum yield (%) |
|---|---|---|
| A2 | none | 68.1 |
| B2 | AEROSIL R104 | 68.8 |
| C2 | AEROSIL R106 | 65.7 |
| D2 | AEROSIL R974 | 68.3 |
| E2 | AEROSIL R812S | 67.7 |
| F2 | CABOSIL TS720 | 70.4 |
| G2 | CABOSIL TS530 | 68.9 |
| H2 | KRATON G1652 | 69.4 |

Example 2

1031 Formulation

Comparison of KRATON to Lower MW Acrylate Oligomers
  KRATON G1652 showed higher compatibility with QDs (higher QY, lower peak wavelength, and FWHM) than the lower MW acrylate oligomers tested.

| Component | formulation | | | | | |
|---|---|---|---|---|---|---|
| | A | B | C | D | E | F |
| Nanoco CFQD™ quantum dot | 0.3 | 0.3 | 0.3 | 0.3 | 0.3 | 0.3 |
| Isobornyl acrylate | 55.2 | 55.2 | 55.2 | 59.2 | 59.2 | 77.2 |
| Tricyclodecane dimethanol diacrylate | 10 | 10 | 10 | 10 | 10 | 10 |
| IRGACURE I-819 | 1.5 | 1.5 | 1.5 | 1.5 | 1.5 | 1.5 |
| KRATON G1652 copolymer | 4.5 | 4.5 | 4.5 | 4.5 | 4.5 | 7.5 |
| CN9010 urethane acrylate oligomer | 20 | 20 | 20 | 20 | 20 | |
| BR-641D urethane acrylate oligomer | 5 | | | | | 1 |
| CN-9014 urethane acrylate oligomer | | 5 | | | | |

-continued

| Component | formulation | | | | | |
|---|---|---|---|---|---|---|
| | A | B | C | D | E | F |
| CN-309 acrylate oligomer | | | 5 | | | |
| CD9055 acrylate additive | | | | 1 | | |
| ZOCO 101 powder | 2 | 2 | 2 | 2 | 2 | 2 |
| TINUVIN 123 | 1.5 | 1.5 | 1.5 | 1.5 | 1.5 | 1.5 |

| | Film thickness (um) | Film QY (%) | Peak wavelength (nm) | Full width half maximum (nm) |
|---|---|---|---|---|
| Formulation A | 31.33 | 46.5 | 645.6 | 63.6 |
| Formulation B | 33.67 | 47.9 | 644.1 | 63.9 |
| Formulation C | 34.00 | 50.6 | 637.7 | 62.1 |
| Formulation D | 27.00 | 43.6 | 637.4 | 59.3 |
| Formulation E | 30.00 | 46.7 | 640.6 | 63.7 |
| Formulation F | 26.67 | 50.9 | 636.4 | 55.7 |

Example 3

1104 Formulation

Comparison of Two KRATON Block Copolymers with Different MW

The KRATON SEBS block copolymer, G1650, with a similar styrene composition but a higher MW (also indicated by solution viscosity in toluene and melt index) showed a higher viscosity enhancement of the acrylate-based QD resins

| Thickener | Styrene content | Mn (kDa) | Solution viscosity in toluene @25° C. (cP) | Melt Index, 230° C., 5 kg (gms/10 min) |
|---|---|---|---|---|
| KRATON G1652M | 29.0-30.8 w % | 85 | 400-525 (20 w %) | 5 |
| KRATON G1650M | 28.8-31.6 w % | 101 | 1100-1900 (20 w %) | <1 |

| Component | formulation | | | | | | | | |
|---|---|---|---|---|---|---|---|---|---|
| | A | B | C | D | E | F | G | H | I |
| Isobornyl acrylate | 62 | 63 | 65 | 67 | 69 | 62 | 63 | 66 | 69 |
| Tricyclodecane dimethanol diacrylate | 24 | 24 | 24 | 24 | 24 | 24 | 24 | 24 | 24 |
| Irgacure I-819 | 1.5 | 1.5 | 1.5 | 1.5 | 1.5 | 1.5 | 1.5 | 1.5 | 1.5 |
| KRATON G1650 copolymer | 9 | 8 | 6 | 4 | 2 | | | | |
| KRATON G1652 copolymer | | | | | | 9 | 8 | 5 | 2 |
| Zoco 101 powder | 2 | 2 | 2 | 2 | 2 | 2 | 2 | 2 | 2 |
| Tinuvin 123 | 1.5 | 1.5 | 1.5 | 1.5 | 1.5 | 1.5 | 1.5 | 1.5 | 1.5 |

| | Viscosity (cP at 25° C.) |
|---|---|
| Formulation A | 4820 |
| Formulation B | 1173 |
| Formulation C | 236.7 |
| Formulation D | 101 |
| Formulation E | 38.5 |
| Formulation F | 500 |
| Formulation G | 350 |
| Formulation H | 146 |
| Formulation I | 39.4 |

Example 4

0421 Formulation

Comparison of Different KRATON Polymers and a Styrene Homopolymer Mixed with a Single Monomer KRATON block copolymers are generally compatible with QDs in IBOA as shown by PLQY, PLmax, and FWHM.

| | Isobornyl acrylate (94.825 wt %) + Additive (5 wt %) + Nanoco CFQD ™ quantum dot (0.175 wt %) | Styrene content of additive | PLQY (%) | Peak wavelength (nm) | Full width half maximum (nm) |
|---|---|---|---|---|---|
| A1 | None | N/A | 75.3 | 639.89 | 57.41 |
| B1 | Polystyrene | 100% | 76.3 | 639.89 | 57.78 |
| C1 | KRATON A1535 | 56-60% | 75.8 | 639.89 | 57.53 |
| D1 | KRATON G1701 | 35-39% | 75 | 640.64 | 57.59 |
| E1 | KRATON G1652 | 28-30% | 77.5 | 638.41 | 57.99 |
| F1 | KRATON G1702 | 26-29% | 73.4 | 639.89 | 57.81 |
| G1 | KRATON G1642 | 19-23% | 73.8 | 639.15 | 58.51 |
| H1 | KRATON G1645 | 12-14% | 74.9 | 639.89 | 57.79 |
| I1 | KRATON G1750 | 0% | 76.1 | 642.12 | 57.26 |

Comparison of Different KRATON Polymers and a Styrene Homopolymer Mixed with a Mixture of a Monomer and a Crosslinker and a Single Crosslinker KRATON block copolymers with a styrene composition higher than 12% are soluble in the IBOA:SR-833 (1:1) mixture, and those with a styrene composition higher than 26% are soluble in SR-833.

| | Additive (5 wt %) + Nanoco CFQD ™ quantum dot (0.175 wt %) | Chemistry | Styrene content of additive | Viscosity (cP at 20° C.) | |
|---|---|---|---|---|---|
| | | | | Isobornyl acrylate (47.41%) + tricyclodecane dimethanol diacrylate (47.41%) | Tricyclodecane dimethanol diacrylate (94.82%) |
| A2 | None | N/A | N/A | 23 | 146 |
| B2 | Polystyrene | Styrene homo | 100% | 441 | 2940 |
| C2 | KRATON A1535 | SEBS triblock | 56-60% | 658 | Gel (high viscosity) |
| D2 | KRATON G1701 | SEP diblock | 35-39% | 96 | 411 |
| E2 | KRATON G1652 | SEBS triblock | 28-30% | 62 | 397 |
| F2 | KRATON G1702 | SEP diblock | 26-29% | 76.5 | 415 |
| G2 | KRATON G1642 | SEBS triblock | 19-23% | 63 | Insoluble |
| H2 | KRATON G1645 | SEBS triblock | 12-14% | 68 | Insoluble |
| I2 | KRATON G1750 | (EP)n star | 0% | Insoluble | Insoluble |

Example 5

0528 Formulation

Comparison of Two Different KRATON Block Copolymers in Full Resin/Film Formulation Replacement of KRATON G1652 with KRATON A1535 with a higher MW and higher styrene content resulted in a lower loading of rheology modifier to obtain comparable resin viscosity, comparable PLQY, and a lower edge ingress of QD films aged at 60° C. and 90 RH %.

| Rheology modifier | Styrene content | Mn (kDa) | Melt index at 230° C., 5 kg, g/10 min |
|---|---|---|---|
| KRATON A1535 | 56-60% | 244 | <1 |
| KRATON G1652 | 28-30% | 85 | 6 |

| | Formulation A | Formulation B |
|---|---|---|
| Nanoco CFQD ™ quantum dot | 0.2 | 0.2 |
| Isobornyl acrylate | 51.3 | 43.8 |
| Tricyclodecane dimethanol diacrylate | 40 | 40 |
| Irgacure I-819 | 1.5 | 1.5 |
| KRATON A1535 copolymer | 3.5 | 0 |
| KRATON G1652 copolymer | 0 | 11 |
| Finex 30S-LP2 zinc oxide powder | 2 | 2 |
| Tinuvin 123 | 1.5 | 1.5 |

| | Viscosity at 25° C. (cP) | PLQY |
|---|---|---|
| Formulation A | 877 | 53.2 |
| Formulation B | 918 | 53.6 |

Edge ingress after 60° C., 90% humidity chamber accelerated testing

| | 72 hrs | 168 hrs | 336 hrs | 504 hrs |
|---|---|---|---|---|
| Formulation A | 0.62 | 1.27 | 1.98 | 2.84 |
| Formulation B | 0.93 | 1.80 | 2.77 | 3.89 |

Example 6

Comparison of Two Different KRATON Block Copolymers in Films (Barrier Property)

Replacement of KRATON G1652 with KRATON A1535 with a higher MW and higher styrene content resulted in a better $O_2$ bather of films which is consistent with the lower edge ingress of QD films at accelerated testing.

| Materials | Formulation A | Formulation B |
|---|---|---|
| Isobornyl acrylate | 53.0 | 57.0 |
| Tricyclodecane dimethanol diacrylate | 30.0 | 32.3 |
| KRATON A1535 | 3.2 | 0 |
| KRATON G1652 | 0 | 9.5 |
| Finex 30S LP2 | 6.0 | 6.0 |
| I-819 | 1.5 | 1.5 |

| | $O_2$ permeability at 50% RH, 76 cmHg, 23° C. (3% $O_2$ & 97% $N_2$), cc/m/day/atm |
|---|---|
| Formulation A2 | 0.047 |
| Formulation B2 | 0.11 |

Example 7

Comparison of Two Different KRATON Block Copolymers in Resins (Rheological Property)

| Materials | Formulation A | Formulation B |
|---|---|---|
| Isobornyl acrylate | 51.4 | 47.6 |
| Tricyclodecane dimethanol diacrylate | 45.6 | 42.4 |
| KRATON A1535 | 3 | 0 |
| KRATON G1652 | 0 | 10 |

The mixture of isobornyl acrylate and tricyclodecane dimethanol diacrylate with 3% KRATON A1535 exhibits rheological simplicity at 20° C. (i.e., it obeys the "Cox-Merz rule" that the complex viscosity as a function of frequency and the shear viscosity as a function of shear rate overlap) indicating a simple polymeric fluid (The structure and rheology of complex fluids, Oxford, N.Y., 1999, Chapter 1), while that with 10% KRATON G1652 does not. A simple polymeric fluid with rheological simplicity is preferred for viscosity control of resins.

| 3% KRATON A1535 ||||||
|---|---|---|---|---|---|
| Frequency sweep || Strain rate sweep-1 || Strain rate sweep-2 ||
| Frequency (rad/s) | Complex viscosity (Pa · s) | Rate (1/s) | Viscosity (Pa · s) | Rate (1/s) | Viscosity (Pa · s) |
| 63.09 | 0.2147 | 0.1892 | 0.2108 | 0.1893 | 0.2242 |
| 39.81 | 0.2102 | 0.2383 | 0.2164 | 0.2383 | 0.2219 |
| 25.12 | 0.2081 | 0.3 | 0.2165 | 0.3 | 0.2177 |
| 15.85 | 0.2069 | 0.3776 | 0.2145 | 0.3777 | 0.2116 |
| 10 | 0.2069 | 0.4754 | 0.2169 | 0.4754 | 0.2102 |
| 6.309 | 0.2069 | 0.5986 | 0.2161 | 0.5986 | 0.2069 |
| 3.981 | 0.2073 | 0.7535 | 0.2116 | 0.7536 | 0.206 |
| 2.512 | 0.2071 | 0.9487 | 0.2083 | 0.9486 | 0.2058 |
| 1.585 | 0.2069 | 1.194 | 0.2071 | 1.194 | 0.2062 |
| 1 | 0.2069 | 1.504 | 0.2067 | 1.504 | 0.2059 |
| 0.6309 | 0.2068 | 1.893 | 0.2061 | 1.893 | 0.2045 |
| 0.3981 | 0.2068 | 2.383 | 0.2056 | 2.383 | 0.2059 |
| 0.2512 | 0.2068 | 3 | 0.2065 | 3 | 0.205 |
| 0.1585 | 0.2065 | 3.777 | 0.2057 | 3.777 | 0.205 |
| 0.1 | 0.2069 | 4.755 | 0.2056 | 4.755 | 0.2051 |
| 0.06309 | 0.2068 | 5.986 | 0.2055 | 5.986 | 0.2048 |
| 0.03981 | 0.2068 | 7.536 | 0.2054 | 7.536 | 0.2048 |
| 0.02512 | 0.2065 | 9.487 | 0.2054 | 9.487 | 0.2048 |
| | | 11.94 | 0.2054 | 11.94 | 0.2048 |
| | | 15.04 | 0.2055 | 15.04 | 0.2049 |
| | | 18.93 | 0.2055 | 18.93 | 0.2049 |
| | | 23.83 | 0.2056 | 23.83 | 0.2049 |
| | | 30 | 0.2055 | 30 | 0.2049 |
| | | 37.77 | 0.2055 | 37.77 | 0.2049 |
| | | 47.55 | 0.2055 | 47.55 | 0.205 |
| | | 59.86 | 0.2055 | 59.86 | 0.2051 |
| | | 75.36 | 0.2055 | 75.36 | 0.2051 |
| | | 94.87 | 0.2055 | 94.87 | 0.2051 |
| | | 119.4 | 0.2055 | 119.4 | 0.205 |
| | | 150.4 | 0.2054 | 150.4 | 0.2049 |
| | | 189.3 | 0.2053 | 189.3 | 0.2048 |
| | | 238.3 | 0.2051 | 238.3 | 0.2046 |
| | | 300 | 0.2048 | 300 | 0.2044 |
| | | 377.7 | 0.2046 | 377.7 | 0.2042 |
| | | 475.5 | 0.2043 | 475.5 | 0.2038 |
| | | 598.6 | 0.2037 | 598.6 | 0.2033 |
| | | 600 | 0.2034 | 600 | 0.203 |

| 10% KRATON G1652 ||||||
|---|---|---|---|---|---|
| Frequency sweep || Strain rate sweep-1 || Strain rate sweep-2 ||
| Frequency (rad/s) | Complex viscosity (Pa · s) | Rate (1/s) | Viscosity (Pa · s) | Rate (1/s) | Viscosity (Pa · s) |
| 63.09 | 0.3421 | 0.1892 | 0.2713 | 0.1894 | 0.306 |
| 39.81 | 0.3443 | 0.2383 | 0.2661 | 0.2383 | 0.2925 |
| 25.12 | 0.3415 | 0.3 | 0.2583 | 0.3 | 0.2892 |
| 15.85 | 0.3373 | 0.3777 | 0.2534 | 0.3777 | 0.274 |
| 10 | 0.3395 | 0.4755 | 0.2546 | 0.4755 | 0.2574 |
| 6.309 | 0.3389 | 0.5985 | 0.2453 | 0.5986 | 0.2359 |
| 3.981 | 0.3389 | 0.7537 | 0.2317 | 0.7536 | 0.2278 |
| 2.512 | 0.3392 | 0.9488 | 0.2244 | 0.9487 | 0.217 |
| 1.585 | 0.3422 | 1.194 | 0.2169 | 1.194 | 0.2102 |
| 1 | 0.3421 | 1.504 | 0.2085 | 1.504 | 0.2057 |
| 0.6309 | 0.3397 | 1.893 | 0.2074 | 1.893 | 0.2101 |
| 0.3981 | 0.3396 | 2.383 | 0.2055 | 2.383 | 0.2077 |
| 0.2512 | 0.3388 | 3 | 0.2042 | 3 | 0.204 |
| 0.1585 | 0.3355 | 3.777 | 0.2045 | 3.777 | 0.2065 |
| 0.1 | 0.3415 | 4.755 | 0.2038 | 4.755 | 0.2032 |
| 0.06309 | 0.3478 | 5.986 | 0.2038 | 5.986 | 0.2039 |
| 0.03981 | 0.3364 | 7.536 | 0.2037 | 7.536 | 0.2041 |
| 0.02512 | 0.3436 | 9.487 | 0.2035 | 9.487 | 0.2035 |
| | | 11.94 | 0.2035 | 11.94 | 0.2034 |
| | | 15.04 | 0.2035 | 15.04 | 0.2035 |
| | | 18.93 | 0.2034 | 18.93 | 0.2034 |
| | | 23.83 | 0.2033 | 23.83 | 0.2034 |
| | | 30 | 0.2031 | 30 | 0.2032 |
| | | 37.77 | 0.2028 | 37.77 | 0.2029 |
| | | 47.55 | 0.2025 | 47.55 | 0.2026 |
| | | 59.86 | 0.2019 | 59.86 | 0.202 |
| | | 75.36 | 0.2011 | 75.36 | 0.2012 |
| | | 94.87 | 0.1999 | 94.87 | 0.2 |
| | | 119.4 | 0.1982 | 119.4 | 0.1983 |
| | | 150.4 | 0.1959 | 150.4 | 0.1961 |
| | | 189.3 | 0.1931 | 189.3 | 0.1933 |
| | | 238.3 | 0.1892 | 238.3 | 0.1893 |
| | | 300 | 0.1844 | 300 | 0.1846 |
| | | 377.7 | 0.1789 | 377.7 | 0.1791 |
| | | 475.5 | 0.1729 | 475.5 | 0.173 |
| | | 598.6 | 0.1663 | 598.6 | 0.1664 |
| | | 600 | 0.1663 | 600 | 0.1664 |

The invention claimed is:

1. A polymer resin comprising:
   (a) quantum dots,
   (b) a compound of formula (I)

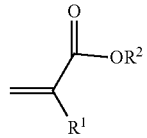

(I)

wherein $R^1$ is hydrogen or methyl and $R^2$ is a $C_6$-$C_{20}$ aliphatic polycyclic substituent, and
   (c) a block or graft copolymer having $M_n$ from 50,000 to 400,000 and comprising from 10 to 100 wt % polymerized units of styrene and from 0 to 90 wt % of a non-styrene block; wherein the non-styrene block has a van Krevelen solubility parameter from 15.0 to 17.5 $(J/cm^3)^{1/2}$.

2. The polymer resin of claim 1 in which $R^2$ is a $C_7$-$C_{17}$ bridged polycyclic substituent.

3. The polymer resin of claim 2 in which the block or graft copolymer is a hydrocarbon polymer which comprises at least 20 wt % polymerized units of styrene and at least 20% polymerized units of alkenes, dienes or a combination thereof.

4. The polymer resin of claim 3 comprising from 70 to 95 wt % of the compound of formula (I), from 1 to 20 wt % of the block or graft copolymer, 0.01 to 5 wt % of quantum dots and from 0.3 to 5 wt % curing agents.

5. The polymer resin of claim 4 in which $R^2$ has a bicyclo[2,2,1]alkane or tricyclodecane ring system.

6. The polymer resin of claim 5 in which the block or graft copolymer has $M_n$ from 60,000 to 300,000.

7. The polymer resin of claim 6 in which the block or graft copolymer has at least 20% polymerized units of styrene and no more than 80 wt % polymerized units of monomers selected from the group consisting of $C_2$-$C_8$ alkenes and $C_2$-$C_8$ dienes.

8. The polymer resin of claim 7 in which the $C_2$-$C_8$ alkenes and dienes are selected from the group consisting of ethylene, propylene, butylene, isoprene and butadiene.

9. The polymer resin of claim 8 in which the hydrocarbon polymer has $M_n$ from 70,000 to 250,000.

10. A polymer resin comprising:
(a) quantum dots,
(b) a compound of formula (I)

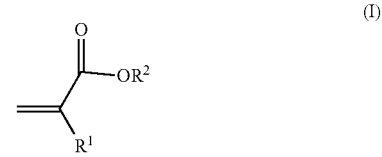

wherein $R^1$ is hydrogen or methyl and $R^2$ is a $C_6$-$C_{20}$ aliphatic polycyclic substituent, and
(c) a homopolymer or random copolymer with $M_n$ greater than polymer critical molecular weight, $M_c$ and with a van Krevelen solubility parameter from 16.5 to 20.0 $(J/cm^3)^{1/2}$.

* * * * *